United States Patent [19]

Pretini

[11] 4,367,627
[45] Jan. 11, 1983

[54] SYSTEMS FOR UTILIZING THE ENERGY OF A MOVING AIR CURRENT

[76] Inventor: Gisberto Pretini, 3, Via Macerata, S. Frediano A Settimo, Pisa, Italy

[21] Appl. No.: 164,574

[22] Filed: Jun. 30, 1980

[30] Foreign Application Priority Data

Jul. 6, 1979 [IT] Italy .................. 45217 A/79
Jul. 12, 1979 [IT] Italy .................. 45219 A/79

[51] Int. Cl.³ ............................. F03G 7/02
[52] U.S. Cl. ................................ 60/641.12
[58] Field of Search ............ 60/641.12, 641.14; 290/44

[56] References Cited

U.S. PATENT DOCUMENTS

| 401,516 | 4/1889 | Robb | 60/641.12 X |
| 757,800 | 4/1904 | Williams | 290/55 |
| 3,048,006 | 8/1962 | Goodman | 60/641.12 |
| 3,436,908 | 4/1969 | Van Delic | 60/641.1 |
| 3,936,652 | 2/1976 | Levine | 290/55 X |
| 4,033,126 | 7/1977 | Newland | 60/398 |
| 4,205,235 | 5/1980 | Pal et al. | 290/44 |

FOREIGN PATENT DOCUMENTS

| 2755959 | 6/1979 | Fed. Rep. of Germany | 60/641.12 |
| 2307982 | 11/1976 | France | 60/641.12 |

Primary Examiner—Allen M. Ostrager
Attorney, Agent, or Firm—McGlew and Tuttle

[57] ABSTRACT

A system for utilizing the energy of a moving air current comprises a chimney through which an air current is induced by barometric or temperature differences between the top and the bottom of the chimney and/or by wind passing over the top of the chimney. A rotor is arranged in the air current and drives an engine. When induced by a wind, the induced air current has a speed which is greater than the wind speed.

1 Claim, 6 Drawing Figures

FIG.1
FIG.2
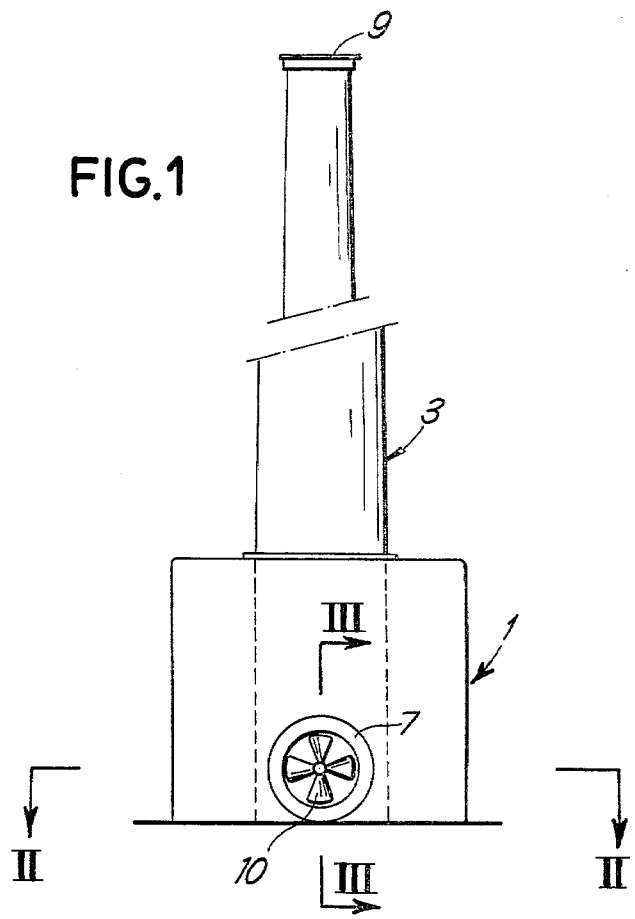
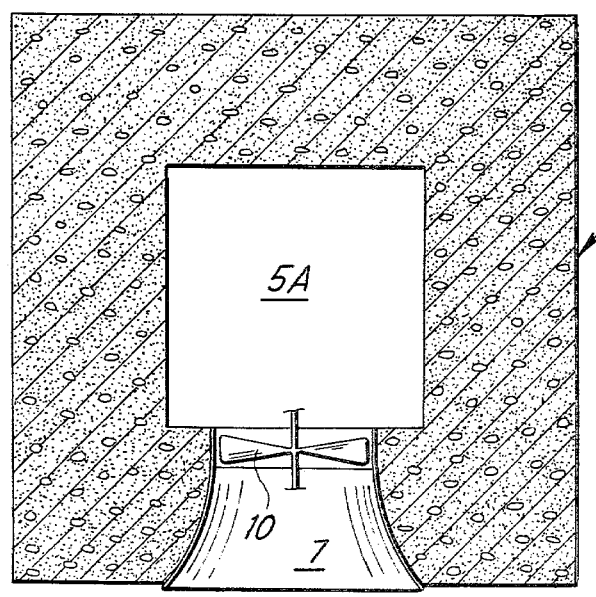

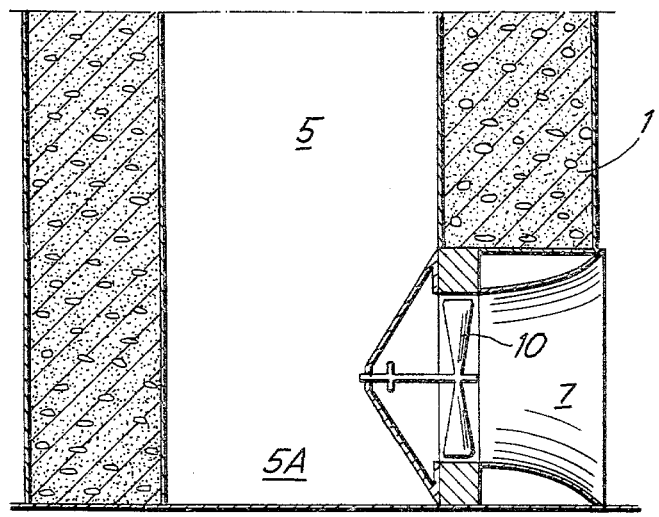
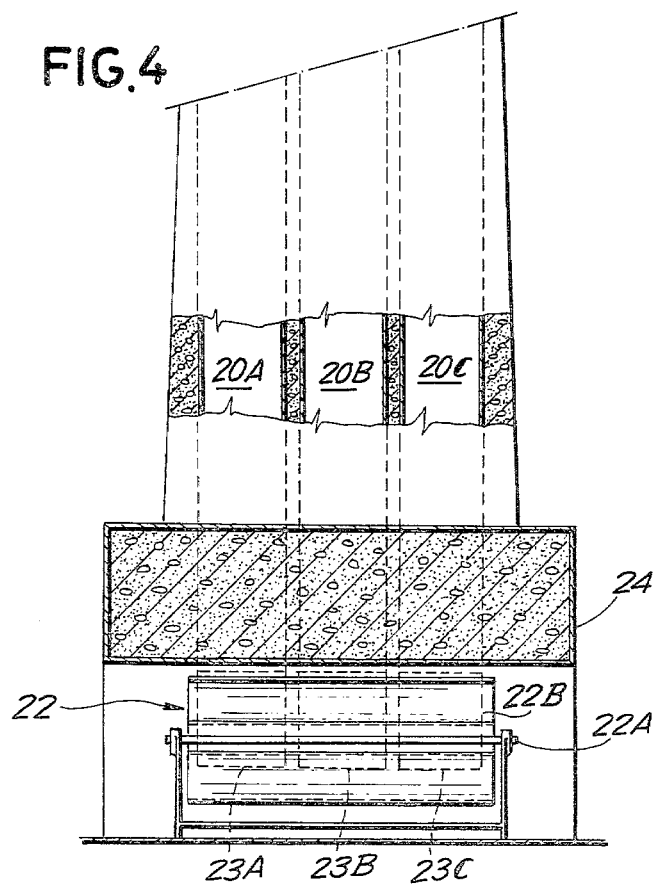

SYSTEMS FOR UTILIZING THE ENERGY OF A MOVING AIR CURRENT

BACKGROUND TO THE INVENTION

1. Field of the Invention

The invention relates to systems for the utilization of the energy of a moving air current.

2. Description of the Prior Art

It has previously been proposed to utilize the energy of a moving air current by use of a wind engine such as a windmill which is located in a windy outdoor position and in which the moving air current of the wind rotates a rotor to drive a mechanical system or an electrical generator. It is a disadvantage of such a system that the pressure exerted on the rotor, and thus the energy imparted to the rotor, is never greater than the maximum pressure which can be generated by the velocity of wind. It is also a disadvantage that there is no way in which the velocity air current provided by the wind can be increased beyond its naturally occurring velocity.

It is an object of the invention to provide a system for the utilization of the energy of an air current in which these disadvantages are mitigated.

SUMMARY OF THE INVENTION

According to a first aspect of the invention there is provided an energy utilization system comprising at least one chimney, means defining a lower inlet mouth to said at least one chimney, means defining an upper outlet mouth to said at least one chimney for inducing an air current into said means defining a lower inlet mouth and through said chimney to said means defining an upper outlet mouth, an engine mounted on the chimney in the path of said air current, and means for driving said engine which means are operated by said air current whereby the energy of the air current is utilized to drive said engine.

According to a second aspect of the invention, there is provided a system for converting the energy of moving air into utilizable energy and comprising: at least one chimney, means defining a passage through the structure from a lower end of the at least one chimney to an upper end of the at least one chimney, means defining an inlet at the lower end of the means defining a passage, means defining an outlet at the upper end of the means defining a passage, a plurality of generators of differing powers, a bladed rotor for driving the engine and located in said means defining an inlet for operation by air passing into the means defining a passage, automatic clutch means connected between said generators and said bladed rotor said automatic clutch means selecting the generator driven by the bladed rotor in accordance with the air speed in said means defining a passage, a deflector arranged adjacent said means defining an inlet for deflecting air onto the bladed rotor for directing air to said bladed rotor.

Thus, an efficiency is obtained which is better than the best possible efficiency obtainable from a conventional wind driven engine with a means for driving the engine of equal characteristics. The reason for this is that, in conventional engines, the air current of the wind acts on the means for driving the engine with a pressure proportional to its speed, whereas the induced draught chimney, for an equal air current speed, produces an ascending air current of greater speed which exerts a greater pressure on the means for driving the engine to give improved operating efficiency. When there is already a rising current in the chimney due to the effect of barometric or temperature differences between the top and the bottom of the chimney, the presence of an external air current will increase the speed of the current within the chimney with consequent increased output from the engine.

BRIEF DESCRIPTION OF THE DRAWINGS

FIG. 1 is a diagrammatic overall front view of a first system for utilizing the energy of a moving air current;

FIG. 2 is a horizontal section on the line II—II of FIG. 1;

FIG. 3 is a vertical section on the line III—III of FIG. 1;

FIGS. 4 and 5 are a front and sectional view of a second multiple chimney system;

DESCRIPTION OF THE PREFERRED EMBODIMENTS

Figure 5:
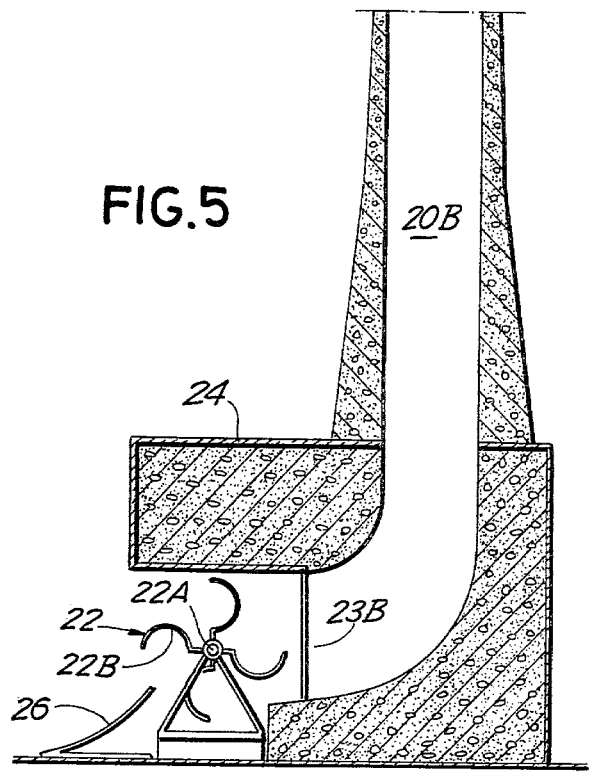

Referring now to FIGS. 1 to 3 of the drawings, a chimney base 1 supports a chimney 3 which defines a duct 5 which extends from the base 1 at point 5A. The base 1 of the induced draught chimney is assumed to be installed on an operating floor, and an inlet mouth 7 to the duct 5 is provided at this level. An upper outlet mouth 9 is provided for the duct 5 of the induced draught chimney 3. A rotor 10 driving an engine (not shown) is located in the inlet mouth 7 with its axis horizontal and parallel to the air current.

In an induced draught chimney, the rising air current is produced by the barometric difference between a lower inlet mouth of the chimney and an upper outlet mouth of the chimney and by any temperature difference between the two mouths. Even in a chimney in which barometric and temperature differences do not give rise to an appreciable rising air current, a rising current can still be induced by an external wind. In this respect, it has been shown that there is a direct relationship between the speed of the rising current in the chimney and the wind speed. Tests carried out on a vertical (brick-built) induced draught chimney about 24 meters high, confirm that in the absence of external wind there is a total or nearly total absence of any rising air current in the chimney. The barometric and thermal gradients across an induced draught chimney of this height exert no influence. However, when there is a wind of appreciable speed, a rising current is produced in the chimney. When the wind speed is at least 1 meter per second, a rising air current is found which, on average, is 2.50 m per second and which reaches 7 m per second when the wind speed is 4 m per second, and 8.20 m per second when the wind speed is 5 m per second.

If the height of the chimney 3 is such that the barometric and temperature differences do not provide a rising air current inside the chimney 3, then the system operates solely by the air currents induced in the duct 5 by the action of the wind, when this is present. If the height of the chimney is sufficient for barometric and temperature differences to give rise to a rising air current in the duct 5 by themselves, then the speed of this air current will be increased and its power raised by the effect of the wind on the upper outlet mouth 9 of the induced draught chimney 3. In any case, in this latter situation, the engine can still be driven by the rising currents produced by said differences even in the absence of wind.

The rotor of the engine may be installed within the chimney 3 between the inlet and the outlet at the point along the path of the air current considered advantageous for maximum efficiency.

Figure 6:
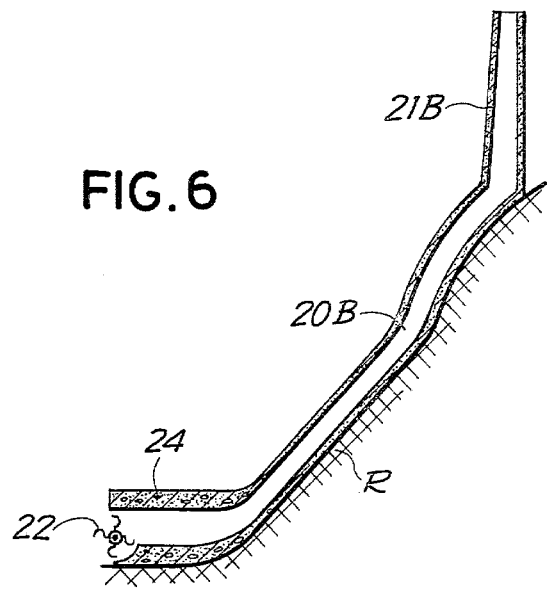
FIG. 6 is a diagram showing a third system of greater power than the first and second systems.

FIGS. 4 to 6 show a system in which three induced draught chimneys 20A, 20B, and 20C are provided which, in practice, may advantageously be laid on a slope R (FIG. 6) or against a brick-built structure (particularly for large installations). It is advantageous for the ends of the chimneys 20A, 20B and 20C such as the end 21B, to be vertical to enable the wind to act on the top of the chimneys 20A, 20B and 20C to exert a suction effect on the rising air current within the chimneys 20A, 20B and 20C in order to increase its speed. The rotor 22 is of the concave blade type with its axis horizontal and extending transversely across the front of the three horizontally aligned inlet mouths 22A, 23B, and 23C formed in a supporting structure 24 of the induced draught chimneys 20A, 20B and 20C. The rotor 22 may comprise a horizontal transverse shaft 22A to which concave blades 22B, shaped as anemometer blades, are rigidly connected along the length thereof. An increased rotor efficiency is obtained using a wind deflector 26 installed to direct the air current from the exterior of the chimneys 20A, 20B, 20C on to the concave faces of the blades, at the same time protecting the convex faces of the blades from the air current. The inlet mouths 23A, 23B, 23C can also be shaped to be closely adjacent the path of the tips of the blades.

The rotor 22 is connected to one or more electrical generators for producing electrical energy.

The power and efficiency of the systems described above with reference to the drawings depend essentially on the difference in level between the inlet mouths of the chimneys at ground level and the outlet mouths at the top of the chimneys. This difference in level produces, in the chimney, an air current which has a speed proportional both to the barometric and temperature differences, and to the temperature at the chimney base. This base temperature can be increased in various ways, for example, by concentrating the sun's rays onto a layer of sand disposed around the base, or by concentrating the sun's rays onto a portion of the exterior surfaces of the chimneys themselves and making the walls of the chimneys such that they pick-up and absorb the solar heat. The rising current can also be made more powerful by arranging the upper ends of the chimneys vertically. In this manner, the wind provides a suction in the chimney ducts which is proportional to the wind speed, with a consequent effect on the rising air current, and a consequent increase in the speed of the air current.

The rising air currents formed in the induced draught chimneys activate the rotor which, in the case of small and medium systems, can be connected directly to an electrical generator. For large systems, the rotor can be connected to several generators—possibly of different powers—which, automatically and alternately, become activated or deactivated according to the amount of power developed by the rotor. The electrical generators are activated and deactivated in relation to the rotational speed of the rotor by means of an automatic clutch system, such that when the rotational speed of the rotor is sufficient to activate an electrical generator of greater power than a generator already driver by the rotor, the generator of greater power is activated by means of an electrically or electro-pneumatically operated selector device, which is operated by the increase in the rotational speed of the rotor.

The drawings show only one embodiment given by way of example only, and modifications can be made to the forms and arrangements without leaving the scope of the inventive idea.

I claim:
1. An energy utilization system comprising:
   a plurality of chimneys arranged side by side in a row, said chimneys extending upwardly along and conforming to a natural hilly slope, said row lying across the slope;
   said chimneys each having a bottom portion extending substantially horizontally and having a lower inlet mouth;
   said chimneys each including a top portion extending substantially vertical, each top portion having a substantially horizontally lined outlet mouth for inducing an air current into each lower inlet mouth and through said chimneys to each upper outlet mouth respectively;
   means on said chimney for absorbing external heat for increasing a temperature of the air current and thus increasing the air current in said chimneys;
   a single engine mounted on said chimneys at said bottom portions thereof and in a path of the air current;
   said engine comprising a rotor mounted for rotation about a horizontal axis and including a plurality of radially extending blades each being concave in a direction opposite the air current adjacent the tip of each inlet mouth; and
   a deflector upstream of the air current positioned adjacent a bottom of each inlet mouth and in front of a bottom portion of said rotor whereby the air current is concentrated at a top of said rotor to rotate said rotor and drive said engine.

* * * * *